Nov. 8, 1949 H. NOYES 2,487,059
SELF-LOCKING NUT OF GENERAL APPLICATION
Filed April 14, 1948
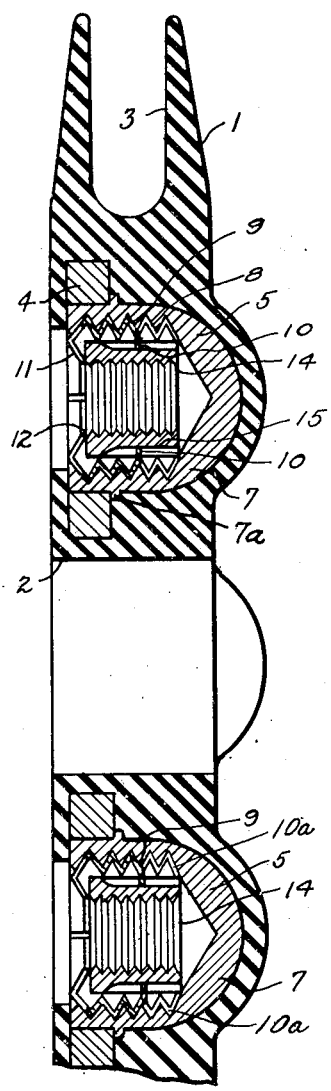
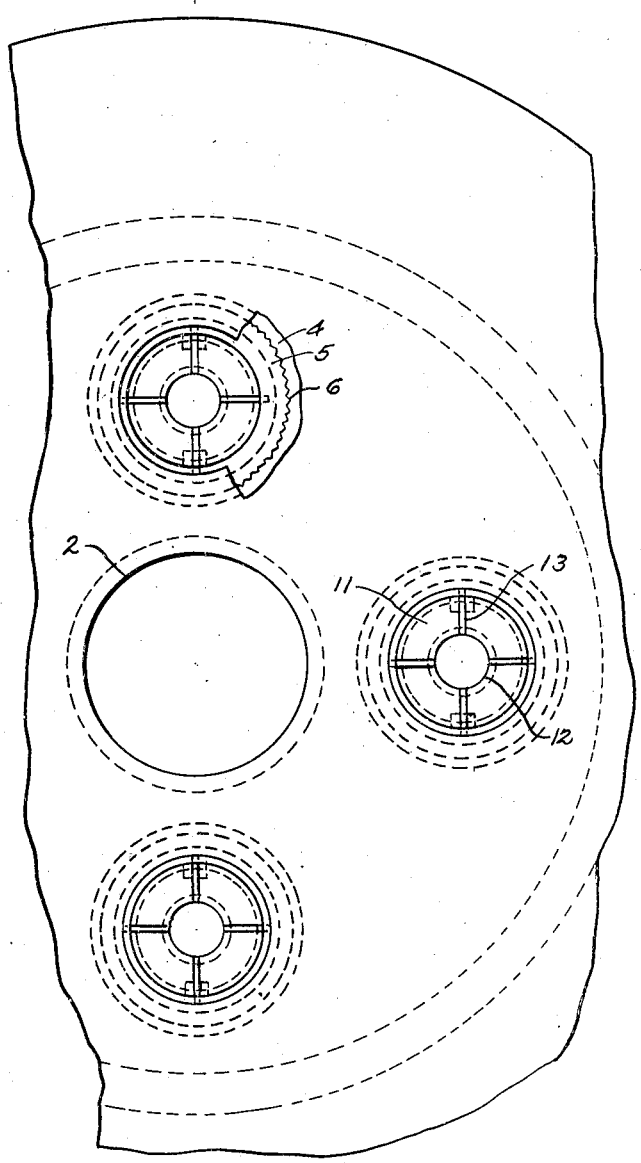
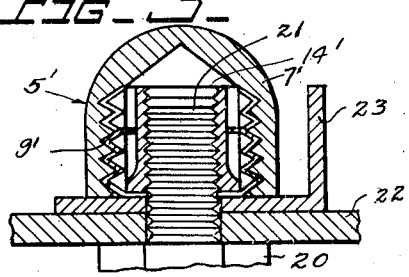
INVENTOR.
HOWARD NOYES
BY Wade Coovey AND
ATTORNEY
Charles L. Burgoyne
AGENT Patented Nov. 8, 1949

2,487,059

UNITED STATES PATENT OFFICE 2,487,059

SELF-LOCKING NUT OF GENERAL APPLICATION

Howard Noyes, Dayton, Ohio

Application April 14, 1948, Serial No. 21,038

7 Claims. (Cl. 151—14)

(Granted under the act of March 3, 1883, as amended April 30, 1928; 370 O. G. 757)

The invention described herein may be manufactured and used by or for the Government for governmental purposes without payment to me of any royalty thereon.

The present invention relates to a self-locking nut adapted for general application.

The primary object of the invention is to provide a self-locking nut which is particularly suited for securing within a recess provided in a structure or member to be secured by means of a bolt or machine screw to another member.

A further object of the invention is to provide a self-locking nut made of metal or other hard material and adapted for installation in a recess preformed in an associated structure or member which may be of a relatively soft material which will not withstand the wear and tear incident to repeated installation of bolts or machine screws.

A further object of the invention is to provide a self-locking nut including a member or retainer adapted to grip a bolt shank when the nut has been tightened into securing position but which does not interfere with free turning of the bolt prior to reaching the tightened position.

Another object of the invention is to provide a two-piece self-locking nut adapted for general application and including one piece having a screw threaded aperture therethrough and retained in position by the other piece which has bolt gripping portions thereon effective to grip a bolt shank associated with the self-locking nut.

Another object of the invention is to provide a two-piece self-locking nut including one piece having a screw threaded aperture therethrough and retained in position within a recess by the other piece having bolt gripping portions thereon and which allows slight displacement of the screw threaded piece to give a self aligning action with respect to the bolt.

Another object of the invention is to provide in a tank fitting of rubber or plastic molded construction an improved screw threaded fastening means for securing a conduit or other member to the tank fitting.

Another object of the invention is to provide a self-locking nut adapted for installation in a recess preformed in an associated member and wherein the installation of said nut may be performed with a minimum of tools or special skill and wherein the nut may be removed at any time if it is desired to replace the same by a new self-locking nut having different screw threads therein.

Another object of the invention is to generally improve the construction of and extend the field of usefulness of screw threaded fastening devices and self-locking nuts.

The above and other objects of the invention will become apparent upon reading the following detailed description in conjunction with the drawing, in which:

Fig. 1 illustrates in plan view a typical application of the present self-locking nut in a tank fitting of molded construction, including a series of self-locking nuts providing means to secure a conduit or other member to the tank fitting.

Fig. 2 is a vertical cross sectional view taken on line 2—2 of Fig. 1.

Fig. 3 is a cross sectional view of another application of the present self-locking nut wherein the nut forms one element of a nut and bolt assembly serving to hold two structural parts in connected relation.

As explained briefly in the objects of the invention the present self-locking nut is adapted for general application and is especially useful in providing a nut for installation within a preformed opening in a member which lacks the hardness and durability required of threaded fastenings. Many common materials of construction lack this desired hardness and yet often require means therein to receive a bolt or machine screw. The present self-locking nut may find wide application in providing screw threads within plastic members, aluminum and magnesium castings or in members of any type which lack the requisite hardness. The nut and bolt are of course generally made of steel or some hard metallic substance. For the purpose of the present description it should suffice to merely cite the possible general applications of the self-locking nut and describe in detail two illustrated embodiments thereof which disclose the essential features of the invention.

Referring first to Figs. 1 and 2 the tank fitting as shown includes a disk 1 of rubber or other flexible plastic material centrally apertured at 2 to provide a passage into or out of a tank (not shown). Around the outer periphery of the disk 1 there is a deep groove formation 3 adapted to receive the portions of the wall of a bladder-type fuel tank adjacent to a preformed opening therein. The portions of the tank wall which fit into the groove 3 are cemented or vulcanized therein to form a permanent connection with the disk. The flanges which form the sides of the groove 3 being flexible may be easily turned back while the disk is being installed in the tank wall at a point which was previously apertured. The flanges overlap the tank wall sufficiently to provide ample surface contact where the parts may be integrally joined by cementing or vulcanizing.

The present tank fitting provides an effective means to connect a conduit or other member to the tank wall. The conduit is provided with a flanged end portion which may be bolted to the resilient tank fitting at the left-hand face thereof (Fig. 2). Thus the right-hand face of the disk 1 will be on the inside of the fuel tank. A bolt receiving assembly comprising a ring 4 and self-locking nuts 5 is permanently molded into the disk 1 at the same time the disk is formed in a suitable molding process. The assembly functions in cooperation with the end flange of the conduit to compress an annular portion of the disk 1 and thus provide a tight joint between the conduit and the tank fitting. It is understood that the ring 4 and the parallel conduit flange have approximately equal inside and outside diameters, and that the inside diameter of the conduit is equal to or slightly less than the diameter of the central aperture 2 in the disk 1.

The tank fitting may be molded or formed in a variety of ways and may be made of numerous different materials. In the form chosen for illustration the ring 4 is first cast or molded around the marginal end portions of hollow shells 7 adjacent to the open ends thereof, or the shells 7 may be pressed into the ring within preformed openings therein. As shown in Fig. 1 at 6, the portions of the shells 7 which are imbedded in the ring may have a grooved surface finish to assist in retaining the shells securely with respect to the ring and prevent relative rotation. It is further noted that the shells 7 are provided on their outer surfaces with peripheral ribs 7a seating against the ring 4 to prevent outward displacement of the shells with respect to the ring. The ring 4 may be of die-cast metal with the shells 7 also being of metal or the parts may be made of durable high-strength plastic materials according to preference and service requirements. For instance the ring 4 may be made of hard rubber or of molded phenolic resin with the preformed shells 7 being made of metal or of a resinous material. It may be preferred in some cases to mold or cast the ring 4 and shells 7 in a unitary structure of any preferred material, this method of manufacture saving the extra step of preforming the shells 7 first. The threaded openings 8 in the shells 7 are plugged up by small bolts before the ring and shell assembly is placed in the mold which forms the disk 1, thus the openings 8 are kept free of the rubber or other material which forms the disk. These temporary bolts may fit into recesses in the mold and may serve to effectively position the ring and shell assembly in correct relation to the walls of the mold. The mold is filled with the material preferred for the resilient disk 1 and then cured to produce a finished tank fitting except for the self-locking nuts to be described. In using a hard plastic material for the ring 4 and shells 7, the molding process whereby the disk 1 is formed may also serve to provide an autogenous bond between the disk and the enclosed securing elements. For example if the disk is to be made of a soft, resilient rubber and the ring and shell assembly is of hard rubber, the molding process for the disk may simultaneously vulcanize the disk to the outer surfaces of the ring and shell assembly. Regardless of the type of material in the ring and shell assembly, the assembly is completely imbedded in the disk 1 except for the bolt receiving openings 8 and the rubber or other material of the disk acts to protect the parts from the corroding effects of liquids in the tank and also from the atmosphere.

The general arrangement of the tank fitting parts being stated above, the remainder of the description of Figs. 1 and 2 is mostly concerned with the self-locking nuts as used therein. The shells 7 each are provided with a deeply threaded inside surface 8 adapted to receive a preformed sheet metal nut retainer and locking member 9 having a threaded formation on its outer cylindrical wall. The member 9 is threaded into place and fits within the shell 7 very snugly for frictional retention therein. A further retaining action is brought about by the bolt locking action to be described below. Spaced from the inner end of the retainer 9 there is provided a pair of integral lugs 10 extending toward each other as shown. At the outer end of the retainer 9 there is provided an integral bolt gripping wall portion 11 which is centrally apertured at 12 to receive an associated bolt. The wall portion 11, which is radially slotted at 13, extends inwardly so as to cause a gripping action on the associated bolt as the wall portion is drawn outwardly from the shell recess under axial pressure of a nut member 14. Thus circular edge portions around the aperture 12 come closer together as the self-locking nut is tightened and accordingly take a firm grip on the bolt threads, as best shown in the embodiment of the invention seen in Fig. 3. At the same time the reaction on the wall portions causes the outer surfaces of the retainer 9 to grip the inner surface 8 of the shell 7 more tightly to prevent turning movement of the retainer with respect to the shell. The slots 13 may vary in length depending on the degree of flexibility desired, but in any case the presence of these slots permits the wall portion 11 to flex outwardly without causing severe internal stresses therein. The slots also permit the separate bolt gripping edge portions around the aperture 12 to conform to the bolt threads and extend into the thread grooves for more efficient bolt gripping action thereon, at the same time avoiding any mutilation of the threads which might be caused by engagement with the ridges forming the bolt threads.

Carried within the shell 7 and within the nut retainer 9 is a cylindrical nut 14 which is provided on its outer cylindrical surface with a pair of grooves 15 adapted to receive the opposite lugs 10 and thus prevent relative rotation of the nut member 14 with respect to the retainer 9. It should be noted that the outer ends of the grooves 15 are closed to prevent removal of the nut 14 from the retainer 9. Before installation of the self-locking nut within the shell 7, the nut member 14 is first assembled with respect to the retainer 9. At this time the lugs 10 are in parallel relation extending inwardly away from the outer wall 11 of the retainer. A nut member 14 is selected which has a thread diameter corresponding to the diameter of the aperture 12 in the outer wall of the retainer. The nut member is then inserted in the retainer and the lugs 10 are bent down, as shown in Fig. 2, by application of a screw driver or other tool into the slots 10a at the inner end of the retainer 9. Thus the assembly of the self-locking nut is complete and the unit can then be installed by threading into the shell 7. It should be understood that in practice the self-locking nut assembly comprising a retainer and cylindrical nut is supplied as a unit ready for application in any type of structure. The user may be sure that the two elements of the self-locking nut correspond and that a bolt which will thread properly into the nut member 14 will be properly engaged by the outer wall 11 adjacent to the aperture 12 when the nut locking function takes effect. Another advantage of the self-locking nut is its self-aligning feature, since the nut member 14 may have slight lateral twisting movement within the retainer 9 to compensate for a possible tilt in the associated bolt.

In use the self-locking nuts receive bolts extending from an associated structural member, such as the flange on a conduit to be secured in place over the passage or aperture 2. The bolt shank may be threaded freely into the cylindrical member 14 but when the connection between the conduit and the fitting begins to tighten, the nut member 14 will exert pressure on the wall portion 11 to flatten the same. As the wall portion 11 is bent toward a planar form, the edge portions of the central aperture 12 come closer together to engage the bolt threads with a gripping action. These bolt gripping portions may extend into the thread grooves (see Fig. 3) and the bolt may continue to turn slightly by threading through the aperture 12 as well as farther into the cylindrical nut 14. As rotation of the securing bolt becomes more difficult due to the frictional gripping action of the retainer 9, the mechanic may sense that the tightening has proceeded far enough. However the mechanic is usually provided with a torque indicating wrench or screw driver, so that the bolt tightening movement may be stopped when the tool shows a predetermined torque setting. It should be particularly noted that the bolt gripping action of the retainer also results in a reaction force on the wall portion 11 which brings the retainer into tighter engagement with the shell 7 or other associated member. It is also to be understood that the coarse threads of the retainer 9 and the finer threads of the nut member 14 are both right hand threads or left hand threads so that tightening action always tends to thread the retainer 9 more securely into position within the associated member, such as shell 7. Thus when the bolt is fully tightened into securing position, the retainer 9 is locked to the shell 7 and the bolt is locked with respect to the retainer 9.

The second illustrated use of the present self-locking nut is in a simple threaded fastener of the cap nut type, and shown in Fig. 3 as associated with a bolt to serve as a structural fastening or connector. The cap nut 5' is shown in secured association with respect to a bolt 20 having a threaded shank 21. The bolt shank extends through concentric apertures in a plate 22 and a bracket 23 to be secured together, with the bolt head abutting the plate 22 as shown.

The cap nut 5' comprises a shell 7' of metal or plastic material and having a threaded inner bore to receive the self-locking nut assembly. The nut assembly includes a sheet metal retainer 9' enclosing a cylindrical nut member 14' prevented from turning with respect to the retainer by the groove and lug arrangement described in connection with Figs. 1 and 2. While the drawing illustrates only a pair of grooves in the nut member 14' and a pair of lugs on the retainer 9' it should be understood that more of such grooves and lugs may be provided if desired. The shell 7' of Fig. 3 is preferably of hexagonal shape on the outside so as to be engageable by a wrench during installation of the nut and bolt.

In applying the self-locking cap nut 5' and bolt 20, the nut is held against rotation while the bolt 20 is threaded into the nut member 14' after being extended through the concentric apertures of the plate 22 and bracket 23. After the shell 7' and the bolt head have engaged the bracket 23 and plate 22 respectively, the nut member 14' starts to flatten the bottom wall portion of the retainer 9' toward the surface of the bracket 23 at the same time causing the circular edge portions of the central aperture of the retainer to engage the bolt shank with an increasing frictional grip. This gripping may continue until the bottom wall portion of the retainer engages the bracket 23 and the parts reach the final position as shown in Fig. 3.

The present self-locking nut is similar in some respects to the self-locking nut devices disclosed in my Patent No. 2,430,884 of November 18, 1947. The similarity resides in the use of a cage or shell to enclose both a nut member and bolt shank gripping member effective only when the nut reaches a securing position. Thus it is necessary to exert no great turning effort to bring the nut to a connected position and almost to the final secured position. Finally the bolt gripping member is flattened by continued tightening of the nut and bolt, so as to grip the threaded bolt shank and provide the desired self-locking action. Since the self-locking nut is adapted to be made entirely of metal it may find extensive use in structures subject to heat and other conditions deleterious to rubber and plastic inserts frequently used on self-locking nuts. The retainer member 9 or 9' may be formed of sheet steel, brass or phosphor bronze and is preferably of a material having considerable springiness, so that when the nut is removed the original shape of the retainer will be restored. The retainer is so proportioned as to thread into the shell or supporting structure with a snug fit and thus be retained in position by friction. The assembly operation is facilitated by the presence of the radial slots in the bottom wall of the retainer, since a special spanner wrench may be used having spaced prongs engageable in the slots to provide means to exert a turning action on the retainer as it is threaded into place.

The present self-locking nut is intended for general application, even though only two applications thereof are illustrated. As noted previously the self-locking nut comprising the retainer and cylindrical nut member is especially well suited for installation in molded or cast members of metal or plastic, since the self-locking nut itself may be made of hard durable materials able to withstand wear more successfully than the material of the surrounding member. Furthermore the self-locking nut may be replaced at any time if found to be worn or mutilated, or if it should be desired to substitute a unit having a different type of screw thread therethrough. The simultaneous self-locking of the bolt and of the retainer is very advantageous, since this avoids any possible weak point in the final secured relation of the parts. The retainer being firmly secured in the associated member and the bolt being firmly secured in the retainer it follows that the bolt and the associated member are securely connected until it is desired to loosen the bolt.

The embodiments of the invention herein shown and described are to be regarded as illustrative only and it is to be understood that the invention is susceptible to variations, modifications and changes within the scope of the appended claims.

I claim:

1. In a self-locking nut of general application, means providing a recess in a member to be secured in place by means of a threaded bolt, a hollow sheet metal locking member secured in said recess, said locking member including an outer wall portion centrally apertured to receive said bolt and said wall portion being initially formed to extend inwardly toward the inner end of said recess, a threaded nut member positioned within said sheet metal locking member and directly behind said wall portion, complementary means on said locking member and said nut member to prevent relative rotation therebetween, and said central aperture being of a size to cause the edges of said wall portion around said aperture to grip the bolt shank as said wall portion is bent outwardly under pressure of said nut member when threadedly engaged by said bolt shank in nut and bolt tightening relation.

2. In a self-locking nut of general application, means providing a cylindrical threaded recess in a member to be secured in place by means of a threaded bolt, a cylindrical sheet metal locking member secured in said recess by screw-threaded engagement with the screw threads of said recess, said locking member including an outer wall portion centrally apertured to receive said bolt and said wall portion being initially formed to extend inwardly toward the inner end of said recess, a threaded nut member positioned within said sheet metal locking member and directly behind said wall portion, complementary means on said locking member and said nut member to prevent relative rotation therebetween, and said central aperture being of a size to cause the edges of said wall portion around said aperture to grip the bolt shank as said wall portion is bent outwardly under pressure of said nut member when threadedly engaged by said bolt shank in nut and bolt tightening relation.

3. A self-locking nut comprising, a generally cylindrical sheet metal retainer and locking member having a screw threaded formation on the outer cylindrical walls thereof and being adapted to be secured in a complementary recess formed in an associated structure, one end of said member being partially closed by a centrally apertured wall portion initially formed to extend inwardly toward the other end of said member, a threaded nut member positioned within said member directly behind said wall portion, complementary means on said locking member and said nut member to prevent relative rotation therebetween, and said central aperture being of a size to cause the edges of said wall portion around said aperture to grip a bolt shank threaded into said nut member through said central aperture as said wall portion is bent outwardly under pressure of said nut member when brought to tightened relation by said bolt.

4. A self-locking nut comprising, a generally cylindrical sheet metal retainer and locking member having a screw threaded formation on the outer cylindrical walls thereof and being adapted to be secured in a complementary recess formed in an associated structure, one end of said member being partially closed by a centrally apertured wall portion initially formed to extend inwardly toward the other end of said member, said wall portion being provided with radial slots opening at one end into said central aperture, a threaded nut member positioned within said member directly behind said wall portion, complementary means on said locking member and said nut member to prevent relative rotation therebetween and to prevent removal of said nut member through said other end of said locking member, and said central aperture being of a size to cause the edges of said wall portion around said aperture to grip a bolt shank threaded into said nut member through said central aperture as said wall portion is bent outwardly under pressure of said nut member when brought to tightened relation by said bolt.

5. A self-locking nut comprising, a generally cylindrical sheet metal retainer and locking member adapted for retention in a complementary recess formed in an associated structure, one end of said member being partially closed by a centrally apertured wall portion initially formed to extend inwardly toward the other end of said member, a threaded nut member positioned within said locking member directly behind said wall portion, complementary means on said locking member and said nut member to prevent relative rotation therebetween, said central aperture being of a size to cause the edges of said wall portion around said aperture to grip a bolt shank threaded into said nut member through said central aperture as said wall portion is bent outwardly under pressure of said nut member when brought to tightened relation by said bolt, and said bolt shank gripping action producing a force reaction on said wall portion effective to tighten the engagement of said locking member with said complementary recess.

6. A self-locking nut comprising, a generally cylindrical sheet metal retainer and locking member adapted for retention in a complementary recess formed in an associated structure, one end of said member being partially closed by a centrally apertured wall portion initially formed to extend inwardly toward the other end of said member, a nut member positioned within said locking member directly behind said wall portion, complementary means on said locking member and said nut member to prevent relative rotation therebetween, and said central aperture being of a size to cause the edges of said wall portion around said aperture to grip a bolt shank threaded into said nut member through said central aperture as said wall portion is bent outwardly under pressure of said nut member when brought to tightened relation by said bolt.

7. In a self-locking nut, a hollow cap member having a cylindrical recess therein, a hollow sheet metal locking member of generally cylindrical shape secured in said recess, said locking member including an outer wall portion centrally apertured to receive said bolt and said wall portion being initially formed to extend inwardly toward the inner end of said recess, a threaded nut member positioned within said sheet metal locking member and directly behind said wall portion, complementary means on said locking member and said nut member to prevent relative rotation therebetween, said central aperture being of a size to cause the edges of said wall portion around said aperture to grip the bolt shank as said wall portion is bent outwardly under pressure of said nut member when brought to tightened relation by said bolt, and said bolt shank gripping action producing a force reaction on said wall portion effective to tighten the engagement of said locking member with said recess.

HOWARD NOYES.

No references cited.